United States Patent [19]
Roth

[11] Patent Number: 5,347,767
[45] Date of Patent: Sep. 20, 1994

[54] FIRE RETARDANT SLEEVE

[76] Inventor: Rudolf Roth, 3556 Boutwell Rd., Lake Worth, Fla. 33461

[21] Appl. No.: 80,447

[22] Filed: Jun. 18, 1993

Related U.S. Application Data

[63] Continuation of Ser. No. 827,367, Jan. 29, 1992, abandoned.

[51] Int. Cl.⁵ .............................................. F16K 17/38
[52] U.S. Cl. ............................................ 52/1; 52/232; 52/220.8
[58] Field of Search ........................... 52/232, 1, 220.8

[56] References Cited

U.S. PATENT DOCUMENTS

| | | | |
|---|---|---|---|
| 4,221,092 | 9/1980 | Johnson | 52/232 |
| 4,538,389 | 9/1985 | Heinen | 52/232 |
| 4,796,401 | 1/1989 | Wexler | 52/232 |
| 4,848,043 | 7/1989 | Harbeke | 52/1 |
| 4,850,385 | 7/1989 | Harbeke | 52/232 |
| 4,918,761 | 4/1990 | Harbeke | 52/232 |
| 5,105,592 | 4/1992 | MacMillan et al. | 52/232 |

*Primary Examiner*—Carl D. Friedman
*Assistant Examiner*—Christopher Todd Kent
*Attorney, Agent, or Firm*—McHale & Slavin

[57] ABSTRACT

Generally, the invention relates to an apparatus or device for use in walls, ceiling, and floor of a multi-storied building that is capable of sealing a raceway used for placement of wires and cables, wherein the improvement allows an installer of the raceway to couple additional sections of the raceway at a convenient location remote from the device. The instant invention is a fire/smoke protection sleeve assembly having a tubular housing used in combination with a impervious collar housing thermal expansive material. A raceway slidably fits within the first housing allowing the raceway to be slidably extendible therethrough for coupling on either side of the device. In the event of a high induction of heat the thermal expansive material of the instant invention expands causing the raceway to collapse thus prevent fire and/or smoke from traveling to area inapposite the situation.

9 Claims, 2 Drawing Sheets

FIRE RETARDANT SLEEVE

This is a continuation of copending application Ser. No. 07/827,367 filed on Jan. 29, 1992 now abandoned.

FIELD OF INVENTION

This invention relates to fire retardant piping networks for use in multi-story buildings and, more particularly, to an improved fire retardant piping apparatus for ease of installing raceways.

BACKGROUND OF INVENTION

Multi-story buildings provide numerous advantages, most obvious of which is the placement of a large number or commercial or residential tenants on a premier plot of land. Peculiar to such buildings are the complex electrical wiring systems required to service present as well as future tenants. Further complicating the requirement is the diversity of electrical systems available and the necessity of customizing the system to meet the needs of a particular tenant. Methods of wiring common electrical systems include the use of insulated wires and cables in raceways, non-metallic sheathed cables, metallic armored cables, busways, copper jacketed or mineral insulated cables, aluminum sheathed cables, nonmetallic sheathed and armored cables in cable support systems, and open insulated wiring on solid insulators, hereinafter referred to as wires or cables. Insulated conductors may be installed in a rigid metal conduit, flexible metal conduit, electric metallic tubing, liquid tight flexible metal conduit, surface metal raceways, underfloor raceway, cellular floor raceway, rigid non metallic conduit and raceways, hereinafter referred to collectively as raceways.

Obviously the electrical conductors must be housed in one of the above mentioned raceways. The problem with placing raceways between floors of a multi-story building is that a fire may spread from floor to floor using the raceway as its connection. Due to this possibility, building codes typically require that the floor/ceiling or barrier is constructed of a fire proof material, such a concrete. In addition, any holes placed in the barrier, such as for the raceway, must have the annular space around the raceway filled with a noncombustible penetrating material to prevent the spread of fire.

U.S. Pat. No. 4,261,598 discloses the use of coupling joints cemented into the floor/ceiling during formation of the floor/ceiling. The result is a cast-in-place pipe.

U.S. Pat. No. 4,901,488 issued to Murota et al., discloses the use of thermal expansion composite molded members that are each molded into a desired shape to fill in the void defined between an inner surface plastic pipe and an outer surface of a plastic pipe. Murota is limited to sealing of the pipe in lieu of concrete fillers.

U.S. Pat. No. 4,916,800 issued to Harbeke discloses the use of a fire retardant fluid coupling method. The disadvantage of this device is that it is essentially a coupling, thus a raceway placement must juncture at the coupling. If the installer cuts the raceway to conform to the location of the coupling and does not exactly measure the correct distance, the raceway becomes waste. If the installer is desirous of saving a raceway cut incorrectly, an additional coupling must be fitted causing additional labor and material expense.

What the prior art teaches is a means for coupling the raceway at the floor/ceiling juncture resulting in a partially hidden or otherwise inaccessible coupling location. Thus, the coupling location increases the possibility of a poor connection, incorrectly sized raceway, or other limitations well documents in the prior art which teaches to avoid the use of raceways cast as part of the floor/ceiling juncture. If the coupling must be replaced and the coupling is made integral with the concrete, the result is a costly rework. Finally, use of a combination coupling/fire retardant device limits the type of raceway to that compatible with the coupling/fire retardant device. All other prior art teaches the formation of a fire barrier around a cast-in pipe effectively teaching away from using a raceway within a sleeve, or larger raceway, thereby allowing the installer freedom of assembly.

What is needed in the art is a device or apparatus that allows for raceway coupling remote from the floor/ceiling fire-retardant barrier thus expediting the installers time, preventing the waste of materials, and preventing ineffectual coupling due to forced couplings at partially hidden or inaccessible locations. It is, therefore, to the effective resolution of the aforementioned problems and shortcomings that the present invention is directed.

SUMMARY OF INVENTION

Generally, the invention relates to an improved apparatus or device capable of sealing a conventional raceway in the floor/ceiling used for placement of wires and cables, wherein the improvement allows an installer of the raceway to couple the raceway remote from the fire retardant sleeve.

The instant invention comprises a first elongated tubular housing means having a side wall of nominal thickness formed by an inner surface and an outer surface. The inner surface defines an interior chamber of a first diameter with an inlet and an outlet. In combination with the first housing is an impervious collar means having a least one thermal expansion member defining a centrally disposed aperture therethrough which is operatively associated with the outer surface of the first housing means. A raceway or second tubular housing means also defined by a side wall of nominal thickness forming an interior chamber of a second diameter with an inlet and an outlet is made available to slidably fit within the interior chamber of the first housing.

Placement of the fire retardant sleeve of the instant invention into a secure position of a floor, ceiling, or wall allows the raceway to be slidably extendible therethrough allowing coupling to either side of the race sleeve remote from the sleeve, the interior of which is made available as a raceway for wires and cables. In the event of a high induction of heat the thermal expansive material of the instant invention expands causing the raceway to collapse thus prevent fire and/or smoke from traveling to area inapposite the situation.

Accordingly, the primary object of the instant invention is to provide a device or apparatus permitting the slidable insertion of a raceway into and therethrough for coupling to another raceway at a distance remote from the device or apparatus.

Another object of the instant invention is to provide a device such that in the event of fire the device is closed off to the flow of smoke and fire by effectively collapsing in the presence of heat.

Still another object of the instant invention is to provide a fire retardant sleeve that can be preformed and transported to the job site for installation.

Other objects and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

The invention may be better understood by reference to the drawings in which.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
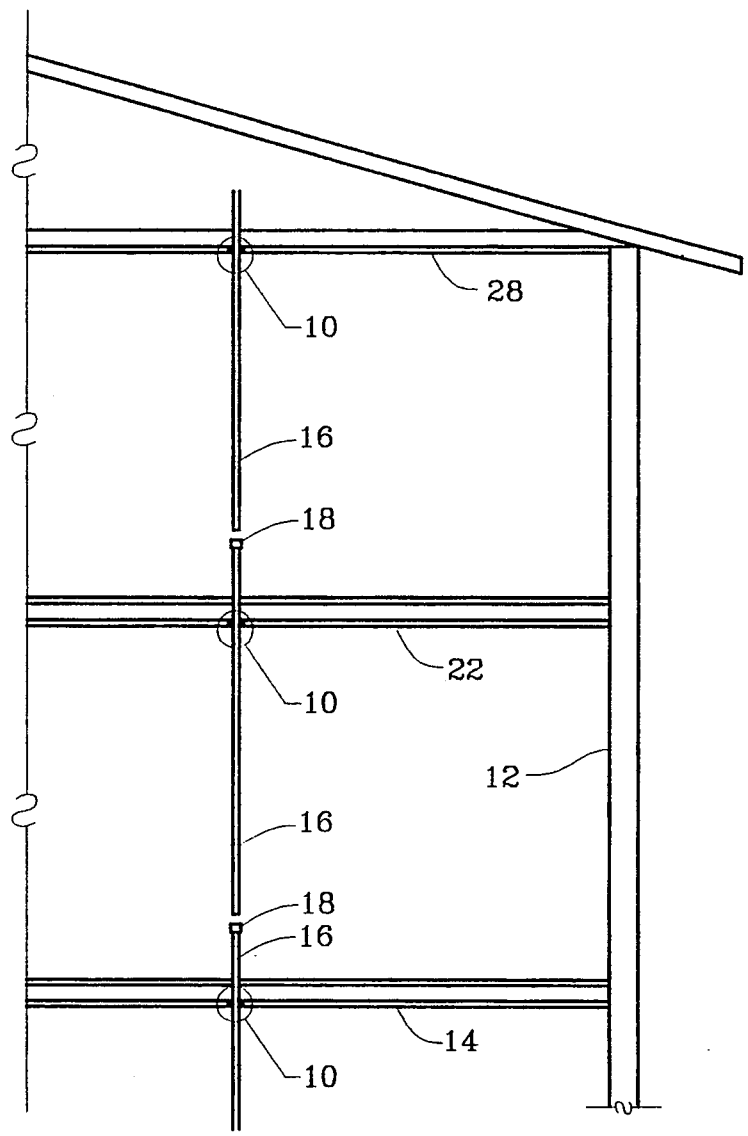
FIG. 1 is a pictorial view depicting the sleeve assembly of the instant invention with the use of external raceway couplings.

Referring to FIG. 1, the fire retardant sleeve assembly is shown generally by numeral 10. The multi-storied building structure 12 includes floor/ceiling 14 wherein the sleeve assembly 10 is shown securely attached thereto. Within the sleeve 10 is placed a tubular housing means depicted as raceway 16 having a side wall of nominal thickness formed by an inner surface and an outer surface. The inner surface of the raceway defining an interior chamber of a diameter allowing the carrying of wires or cables. The raceway 16 slidably fits within an interior chamber of the sleeve 10. At one end of the raceway 16 a conventional coupling 18 designed for the particular raceway can be placed allowing continuation of the raceway and associated wires or cables by means of raceway 16.' Accordingly, 16' is a tubular housing means having a side wall of nominal thickness formed similar to that of 16 and is further slidably insertable into a similarly situated sleeve assembly placed bastion, that is held tightly, in floor/ceiling 22. Continuity allows raceway 16' to couple to raceway 16'' by use of coupling 18' through ceiling 24 and so forth.

Figure 2:
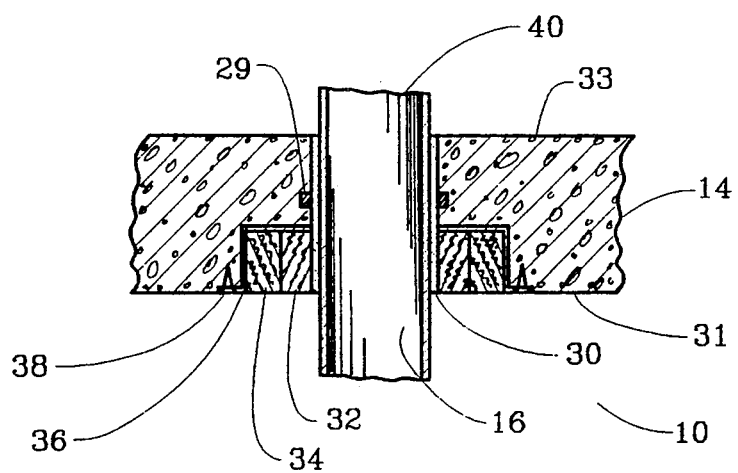
FIG. 2 is a side sectional view of the sleeve assembly disposed within a concrete floor/ceiling member.
Figure 3:
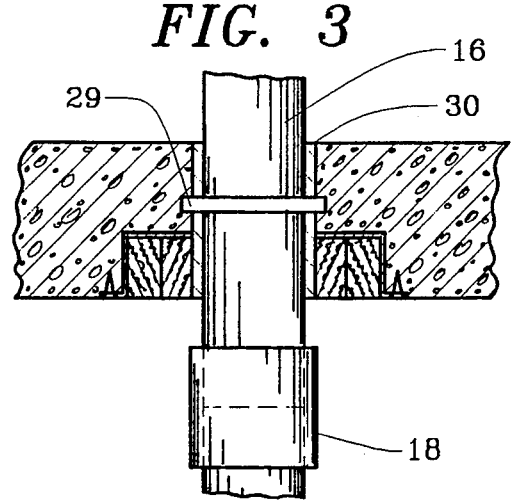
FIG. 3 is a side sectional view of the sleeve assembly with an external coupling.

FIG. 2 and 3 disclose sleeve assembly 10 located in a typical floor/ceiling made of concrete 14 wherein first elongated tubular housing means 30 is defined by a side wall of nominal thickness formed by an inner surface and an outer surface. The tubular housing means 30 is made of deformable metal conduit or plastic pipe such as polyvinlychloride or the like. Perferrably the housing means 30 has a minimal thickness such as 12 guage thus allowing ease of deformation when needed, however, conventional schedule 40 PVC pipe is suitable. Along the outer surface of the housing 30 is a key out 29 optionally provided which simply prevents the housing 30 from sliding out of the concrete 14. The inner surface of the tubular housing 30 provides an interior chamber of a first diameter having an inlet and an outlet, the inlet and outlet made flush with ceiling surface 31 and floor surface 33.

The impervious collar means encompassing the tubular housing means 30 is operatively associated with thermal expansion members 32 and 34 which define a centrally disposed aperture therethrough. For ease of assembly, thermal expansion members 32 and 34 are securely held in position by housing 36 which is permanently attached to the concrete 14 by screws 38 or the like. The thermal expansion members can be fire barrier strip wrap FS-195 or caulk CP-25 made by 3M. Another source of thermal expansion material is SEF-1900 made by Furukawa Electric Co., Ltd of Japan. Yet another source of thermal expansion material is DOW CORNING Fire Stop Intumescent Wrap Strip #2002. Typically among these materials is their ability to expand up to ten times their orignial volume when exposed to temperatures in excess of 350 F.

A second tubular housing means 16 is shown having a side wall of nominal thickness formed by an inner surface and an outer surface, the inner surface defining an interior chamber of a second diameter with an inlet and an outlet. The second housing 16 may be a rigid metal conduit, flexible metal conduit, electric metallic tubing, liquid tight flexible metal conduit, surface metal raceways, underfloor raceway, cellular floor raceway, rigid non metallic conduit and raceway, or the like pipe conventionally used for carrying of wire or cables. The second housing 16 available to slidable fit within the interior chamber of the first housing 30. FIG. 3 further illustrates the remote location of coupling 18 placed external sleeve assembly 10. This configuration allows the installer to slide raceway 16 into and through the floor/ceiling 14 exposing the inserted end of the raceway on the opposite side of the insertions side of the floor/ceiling fixture. For this reason all couplings can be made at the installers convenience saving time, money, and preventing the waste of materials. Use of the instant invention requires no measurement between coupling locations as coupling attachment is dependent upon need or length of raceway instead of necessity due to fixed coupling location in the ceiling/floor.

Figure 4:
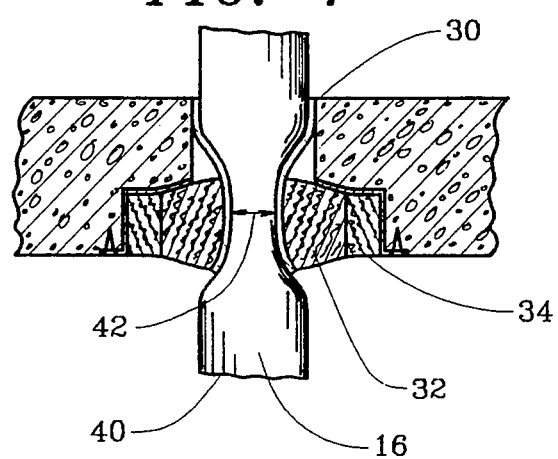
FIG. 4 is a pictorial side sectional view of the sleeve assembly illustrating the effect of thermal expansion.

Now referring to FIG. 4 the sleeve assembly 10 is shown wherein first elongated tubular housing means 30 and raceway 16 is deformed by thermal expansion members 32 and 34 which redefine a centrally disposed aperture 42 therethrough upon the introduction of a high heat gradient. The heat causing the thermal expansion or intumescent members 32 and 34 to increase in proportion causing the collapse of the raceway thereby preventing smoke and/or fire from transmitting therethrough. It should be noted that the number of intumescent members is a function of the volume to be collapsed, two members covering twice the volume that a single member encompasses.

Figure 5:
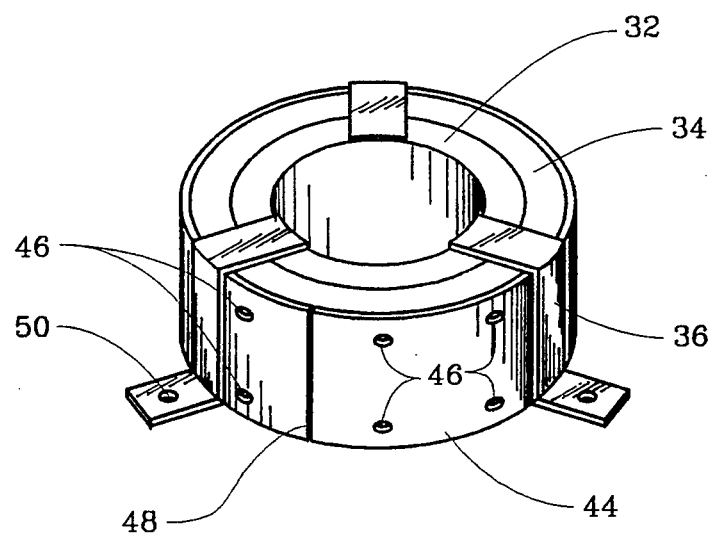
FIG. 5 is a perspective view of the sleeve assembly without the insertion housing.

FIG. 5 provides a perspective view of the sleeve assembly without the housing 30 whereby thermal expansion members 32 and 34 are maintained in position by wrap housing 44 which acts as a heat conductive shield, where the heat is supplied by a fire, and which may overlap 48 without affecting its operation. Strap bands 36 are logistically placed to further prevent the thermal expansion members from falling out of the wrap 44 and holes 50 are provided for attaching the device to the floor/ceiling member.

It is to be understood that while we have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim as new and desire to secure by Letters Patent of the United States is:

1. A smoke and fire protection assembly providing a heat sealable raceway through a concrete floor or wall mounting location, said assembly comprising: at least one intumescent thermal expansion member having a centrally disposed aperture positioned within a heat conductive shield defined by an outer side wall; a tubular sleeve defined by a wall of minimal thickness having an inner surface forming an interior chamber and an outer surface operatively associated with said aperture, said sleeve having a length sized to accommodate thickness of a mounting location; means for independently securing said tubular sleeve to the mounting location, wherein said means for independently securing said tubular sleeve is a key out integrated into said outer surface of said tubular sleeve; and a raceway formed from a pipe having an interior chamber defined by a wall of nominal thickness and an inlet and outlet demarcating a length greater than said length of said sleeve, said pipe insertable into said sleeve forming a raceway for carrying continuous line items from one room to another, said inlet and outlet of said pipe available for coupling additional raceways at a distance separate from the mounting location.

2. A sleeve assembly according to claim 1 wherein said conductive shield defines a circular section when viewed normal to the top of said sleeve.

3. A sleeve assembly according to claim 1 wherein said means for independently securing said sleeve to the mounting location is further defined as a key out integrated into said outer surface of said sleeve.

4. A sleeve assembly according to claim 1 wherein said tubular sleeve is constructed of plastic that is deformable upon subjection to heat.

5. A sleeve assembly according to claim 1 wherein said conductive shield provides controlled inwardly radial expansion of said member.

6. A sleeve assembly according to claim 1 wherein said tubular sleeve is flush with each side surface of a mounting location.

7. A sleeve assembly according to claim 1 wherein said conductive shield includes a means for attaching said shield to a side surface of a mounting location.

8. A sleeve assembly according to claim 1 wherein said pipe is integral with said sleeve.

9. A smoke and fire protection assembly providing a heat sealable raceway through a concrete floor or wall mounting location, said assembly comprising: at least one intumescent thermal expansion member having a centrally disposed aperture positioned within a heat conductive shield defined by an outer side wall for providing controlled inwardly radial expansion of said member; a heat deformable plastic tubular sleeve defined by a wall of minimal thickness having an inner surface forming an interior chamber and an outer surface operatively associated with said aperture, said sleeve having a length sized to accommodate thickness of a mounting location and a key out integrated onto said outer surface of said sleeve; and a raceway formed from a pipe having an interior chamber defined by a wall of nominal thickness and an inlet and outlet demarcating a length greater than said length of said sleeve, said pipe insertable into said sleeve forming a raceway for carrying continuous line items from one room to another, said inlet and outlet of said pipe available for coupling additional raceways at a distance separate from the mounting location.

* * * * *